United States Patent

Ohno et al.

[11] 3,857,863
[45] Dec. 31, 1974

[54] CERTAIN FURYLMETHYL AND THENYL ESTERS OF CERTAIN CYCLOPROPANE CARBOXYLIC ACIDS

[75] Inventors: Nobuo Ohno; Nobushige Itaya, both of Ikeda; Toshio Mizutani, Hirakata; Yositosi Okuno, Toyonaka; Keimei Fujimoto; Toru Kawanami, both of Kobe, all of Japan

[73] Assignee: Sumitomo Chemical Company, Limited, Osaka, Japan

[22] Filed: Aug. 2, 1971

[21] Appl. No.: 168,369

[30] Foreign Application Priority Data
Aug. 4, 1970  Japan.............................. 45-68459

[52] U.S. Cl..... 260/347.4, 260/332.2 R, 260/347.8, 424/275, 424/285, 260/333.2 R
[51] Int. Cl. ....... C07d 5/18, C07d 5/20, C07d 5/16
[58] Field of Search................... 260/347.4, 332.2 R

[56] References Cited
UNITED STATES PATENTS

| | | | |
|---|---|---|---|
| 3,465,007 | 9/1969 | Elliot .............................. | 260/347.4 |
| 3,573,328 | 3/1971 | Nakanishi et al................ | 260/347.4 |
| 3,671,548 | 6/1972 | Itaya et al....................... | 260/332.2 |
| 3,673,215 | 6/1972 | Vollrath et al................... | 260/347.4 |
| 3,702,333 | 11/1972 | Nakanishi et al................ | 260/347.4 |

OTHER PUBLICATIONS
Nakanishi et al., Chem Abstracts (1971), vol. 75, 140667; Abstract of Japanese Patent 7,131,220, Sept. 10, 1971.

Ogami et al., Chem. Abstracts (1971), vol. 74, 22096; Abstract of Bochu-Kagaku 1970, 35(2), pp. 45-55.

*Primary Examiner*—Henry R. Jiles
*Assistant Examiner*—Bernard I. Dentz
*Attorney, Agent, or Firm*—Stevens, Davis, Miller & Mosher

[57] ABSTRACT

A cyclopropanecarboxylate represented by the formula,

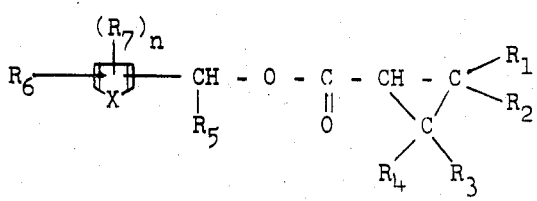

wherein $R_1$ is hydrogen atom, methyl or ethyl group, $R_2$ is methyl, ethyl, 2-methyl-1-propenyl or 2-methoxycarbonyl-1-propenyl group when $R_1$ is hydrogen atom, or $R_2$ is methyl or ethyl group when $R_1$ is methyl or ethyl group, and $R_3$ and $R_4$ are respectively hydrogen atom, methyl or ethyl group, provided that the case where $R_1$, $R_3$ and $R_4$ are simultaneously hydrogen atom is excluded, $R_5$ is a lower alkynyl or a lower alkenyl group, $R_6$ is a lower alkynyl, a lower alkenyl or a lower alkoxyalkyl group, $R_7$ is hydrogen atom, a lower alkyl or a lower alkoxy group or a halogen atom, n is 1 or 2, and X is oxygen or sulfur atom, which is useful as an active ingredient of insecticides.

17 Claims, No Drawings

CERTAIN FURYLMETHYL AND THENYL ESTERS OF CERTAIN CYCLOPROPANE CARBOXYLIC ACIDS

The present invention relates to a novel cyclopropanecarboxylate and an insecticidal composition containing the same.

More particularly, the present invention pretains to a cyclopropanecarboxylate represented by the formula [I],

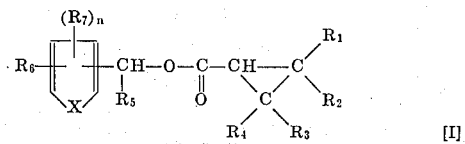

wherein $R_1$ is hydrogen atom, methyl or ethyl group, $R_2$ is methyl, ethyl, 2-methyl-1-propenyl or 2-methoxycarbonyl-1-propenyl group when $R_1$ is hydrogen atom, or $R_2$ is methyl or ethyl group when $R_1$ is methyl or ethyl group, and $R_3$ and $R_4$ are respectively hydrogen atom, methyl or ethyl group, provided that the case where $R_1$, $R_3$ and $R_4$ are simultaneously hydrogen atom is excluded, $R_5$ is a lower alkynyl or a lower alkenyl group, $R_6$ is a lower alkynyl, a lower alkenyl or a lower alkoxyalkyl group, $R_7$ is hydrogen atom, a lower alkyl or a lower alkoxy group or a halogen atom, $n$ is 1 or 2, and X is oxygen or sulfur atom, and also pertains to an insecticidal composition containing as an active ingredient the said cyclopropanecarboxylate.

Pyrethrum extract (containing pyrethrin) and analogues thereof, i.e. synthetic allethrin have heretofore been used in environmental sanitation, agriculture and horticulture, because of their prominent insecticidal activities, particularly, rapid knock down effect, without any toxicity to mammals and because they can hardly give insects resistant properties to any insecticidal agent.

On the other hand, they are not satisfactory fur further wide uses because of a relatively expensive production cost and insufficient persistent properties.

An object of the present invention is to provide an insecticidal composition having more prominent insecticidal activities with a lower production cost, compared with those of conventional insecticidal compositions.

Another object of the present invention is to provide a cyclopropanecarboxylate useful for the production of the said insecticidal composition.

These and other objects can be accomplished by providing a novel cyclopropanecarboxylate represented by the formula [I], which may be prepared by reacting an alcohol represented by the formula [II],

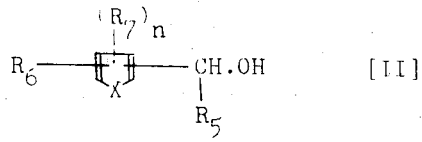

wherein $R_5$, $R_6$, $R_7$, X and n are as defined above, with a cyclopropanecarboxylic acid represented by the formula [IV],

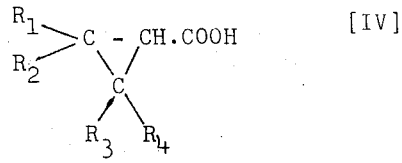

wherein $R_1$, $R_2$, $R_3$ and $R_4$ are as defined above, or a reactive derivative thereof, if necessary, in the presence of a suitable solvent, a reaction auxiliary agent and a catalyst.

In the present invention, a reactive derivative of the cyclopropanecarboxylic acid represented by the formula [IV] includes an acid halide and an anhydride thereof. These reactive derivatives may be prepared easily according to the conventional procedure, for example, the reactive derivative of the cyclopropanecarboxylic acid [IV] may be prepared by using a halogenated thionyl, a phosphorus chloride and acetic anhydride.

5-Propargyl-2-α-ethynylfurfuryl alcohol included in the alcohol represented by the formula [II] is novel and may be prepared easily by reacting an aldehyde represented by the formula,

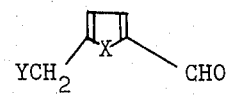

wherein X is as defined above and Y is chlorine or bromine atom, with an ethynylmagnesium halide.

The present process will be explained in more detail below.

In case where the cyclopropanecarboxylic acid per se is used, the reaction with the alcohol is controlled under anhydrous conditions using such a dehydrating agent as dicyclohexylcarbodiimide in the presence of a suitable inert solvent at room temperature or at an elevated temperature, whereby the objective compound can be obtained in a high yield.

In case where a halide of the cyclopropanecarboxylic acid is used the reaction with the alcohol is conducted completely at room temperature in the presence of such an organic tertiary base as pyridine and triethylamine as a dehydrogen halide agent. The halide used may be optionally selected from the groups included in the scope of the present invention, and usually an acid chloride is preferably used. In this reaction, it is preferable to use an inert solvent such as benzene, toluene and petroleum benzine in order to make the reaction smooth.

Further in case where an acid anhydride is used as the reactive derivative of the cyclopropanecarboxylic acid, the reaction with the alcohol may be conducted without a peculiar auxiliary agent at room temperature. In this reaction, it is preferable to conduct the reaction under heating in order to accelerate the reaction, and preferable to use an inert solvent such as toluene and xylene in order to make the reaction smooth, but they are not always necessary.

According to the process of the present invention, the following compounds are prepared easily, but it is needless to say that the present invention is not limited thereto. In addition, the cyclopropanecarboxylates represented by the formula [I], of course, include their geometrical isomers due to the stereoisomerism of the cyclopropanecarboxylic acids of the formula [II], and their optical isomers due to the assymetric carbon atom of the alcohol of [III], and of the cyclopropanecarboxylic acid of [II].

| Compound No. | Formula |
|---|---|
| (1) | 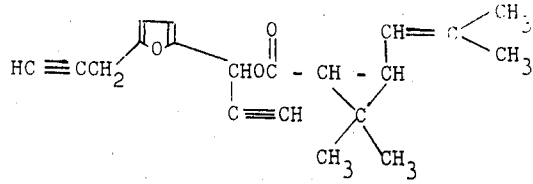 |

5-propargyl-α-ethynylfurfurylchrysanthemate (2) 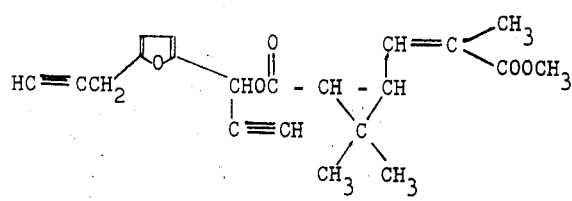

5-propargyl-α-ethynylfurfurylpyrethrate (3) 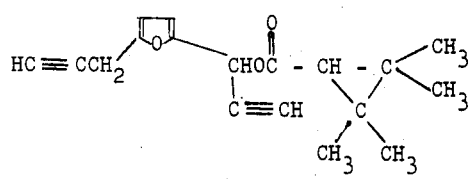

5-propargyl-α-ethynylfurfuryl 2',2',3',3'-tetramethylcyclopropanecarboxylate (4) 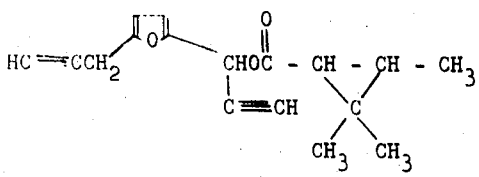

5-propargyl-α-ethynylfurfuryl 2',2',3'-trimethylcyclopropanecarboxylate (5) 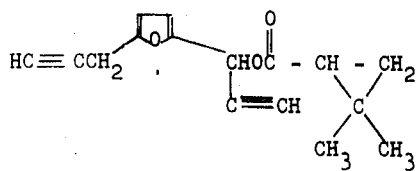

5-propargyl-α-ethynylfurfuryl 2',2'-dimethylcyclopropanecarboxylate (6) 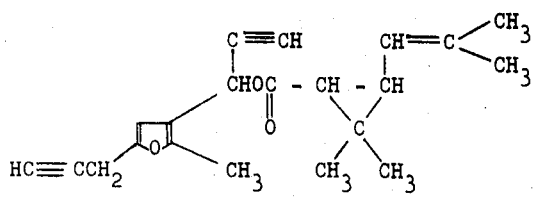

2-methyl-5-propargyl-3-(α-ethynyl)furylmethylchrysanthemate (7) 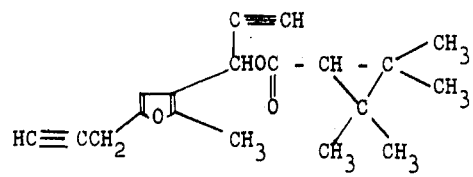

2-methyl-5-propargyl-3-(α-ethynyl)furylmethyl 2',2',3',3'-tetramethylcyclopropanecarboxylate (8) 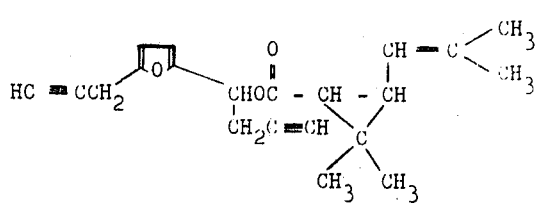

5-propargyl-α-propargylfurfurylchrysanthemate (9) 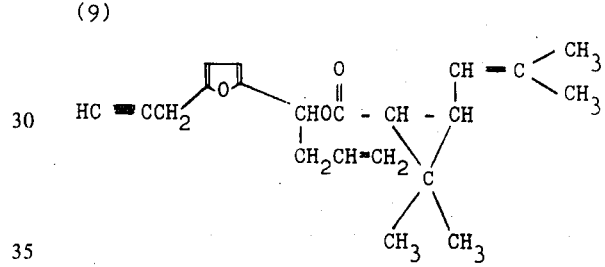

5-propargyl-α-allylfurfurylchrysanthemate

(10) 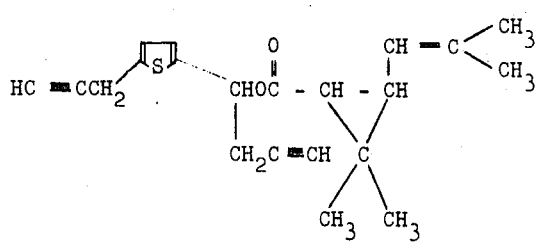

5-propargyl-2-(α-propargyl)thenylchrysanthemate

(11) 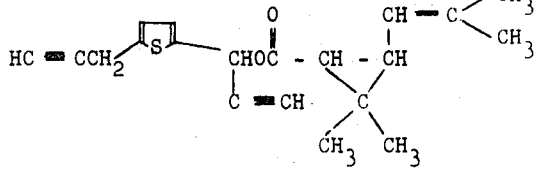

5-propargyl-2-(α-ethynyl)thenylchrysanthemate

(12) 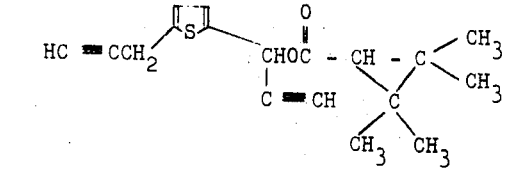

| Compound No. | Formula |
|---|---|
| (13) | 5-propargyl-2-(α-ethynyl)thenyl 2',2',3',3'-tetramethylcyclopropanecarboxylate 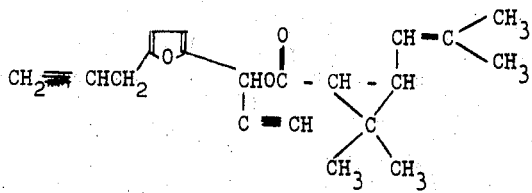 |
| (14) | 5-allyl-α-ethynylfurfurylchrysanthemate 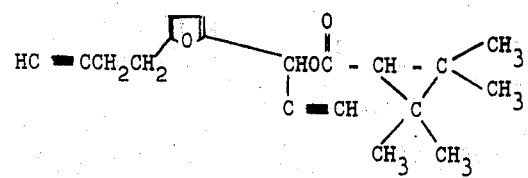 |
| (15) | 5-(3'-butynyl)α-ethynylfurfuryl 2'',2'',3'',3''-tetramethylcyclopropanecarboxylate 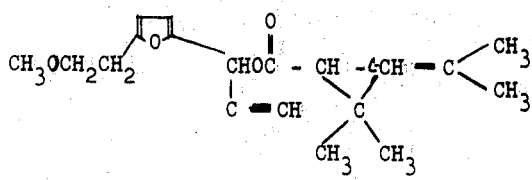 |
| (16) | 5-methoxyethyl-α-ethynylfurfurylchrysanthemate 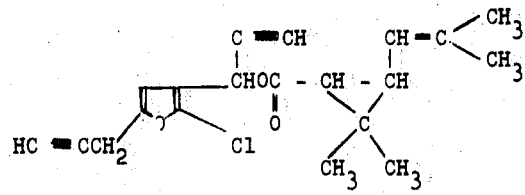 |
| (17) | 2-chloro-5-propargyl-3-(α-ethynyl)furylmethylchrysanthemate 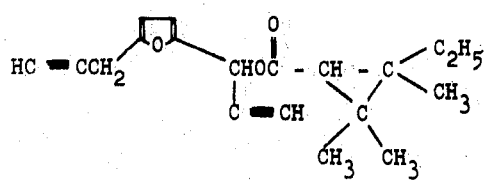 |

5-propargyl-α-ethynylfurfuryl 2',2',3'-trimethyl-3'-ethylcyclopropanecarboxylate The present process will be illustrated in more detail with reference to the following standard operation processes.

A. Process of the reaction between the alcohol and the carboxylic acid halide.

A solution of 0.05 mol of the alcohol in 3 times amount by volume of dry benzene is mixed with 0.075 to 0.15 mol of pyridine. On the other hand, 0.05 to 0.053 mol of the carboxylic acid chloride is dissolved in 3 times amount by volume of dry benzene, and the resulting solution is added dropwise to the solution previously prepared above, whereby exothermic reaction proceeds. The reaction mixture is allowed to stand over night under stirring, and is thereafter mixed with cool water to dissolve pyridine hydrochloride deposited, and an aqueous layer is separated. An organic layer is washed with 5% aqueous hydrochloric acid solution, an aqueous solution saturated with sodium bicarbonate, and an aqueous solution saturated with sodium chloride in this order, and is dried over anhydrous sodium sulfate. Benzene is thereafter distilled out, and the residue is, if desired, purified by means of silica gel chromatography, recrystallization or the like, whereby the objective compound is obtained.

B. Process by the dehydration between the alcohol and the carboxylic acid

A mixture of each of 0.05 mol of the alcohol and the carboxylic acid in 3 times amount by volume of benzene, and 0.08 mol of dicyclohexylcarbodiimide is allowed to stand over night under a close stopper. On next day, the mixture is heated under reflux for 2 hours to complete the reaction, and is thereafter cooled. Dicyclohexylurea deposited is separated by filtration, and the filtrate is treated according to the procedure similar to that of the standard operation process A, whereby the objective compound is obtained.

C. Process by the reaction between the alcohol and the carboxylic anhydride

A solution of 0.05 mol of the alcohol in 3 times amount by volume of toluene is mixed with 0.05 mol of the carboxylic anhydride (prepared by the reaction between the carboxylic acid and acetic anhydride), and the mixture is heated at 100°C for 3 hours, and is thereafter cooled and neutralized with a 5 to 10% aqueous sodium hydroxide solution to recover the carboxylic acid by-produced. The organic layer is treated according to the procedure similar to that of the standard operation process A, whereby the objective compound is obtained.

In carrying out the standard operation processes mentioned above, the amounts of the starting materials, if desired, may be decreased in a fixed ratio. As the embodiment, there is shown the results where the compound (1) was synthesized according to the standard operation process (A) using the carboxylic halide and the alcohol.

Example of the synthesis

A solution of 2.0 g (0.013 mol) of 5-propargyl-α-ethynylfurfuryl alcohol and 2.9 g (0.037 mol) of pyridine in 30 ml of dry benzene was cooled and kept at 10°C or below with ice, and a solution of 2.3 g (0.013 mol) of chrysanthemoyl chloride in 5 ml of dry benzene was added dropwise thereto. The ice water bath was removed after the addition, and the mixture was stirred at room temperature over night to complete the reaction. The reaction mixture was poured into cool water to dissolve pyridine hydrochloride deposited, and was thereafter isolated. The organic layer was washed with 5% aqueous hydrochloric acid solution, an aqueous solution saturated by sodium bicarbonate and an aqueous solution saturated by sodium chloride, and was dried over anhydrous sodium sulfate. Benzene was distilled out under a reduced pressure, whereby 3.8 g of a yellowish orange oil of 5-propargyl-α-ethynylfurfuryl chrysanthemate ($n_D^{25}$ 1.5049) was obtained.

| Elementary Analysis | C (%) | H (%) |
|---|---|---|
| Found | 77.48 | 7.20 |
| Calculated (as $C_{20}H_{22}O_3$) | 77.39 | 7.15 |

The results obtained according to the standard operation process are shown in the following Table.

| Example No. | Starting material | | | Obtained cyclopropanecarboxylic acid ester | | | | | |
|---|---|---|---|---|---|---|---|---|---|
| | Alcohol | Cyclopropanecarboxylic acid derivative | Process | Compound No. | Yield (percent) | Refractive index ($n_D^{25}$) | Elementary analysis | | |
| | | | | | | | | C | H | S |
| 1 | 2-(5-propargyl)-furyl-ethynyl carbinol. | Chrysanthemic acid chloride. | A | (1) | 87 | 1.5049 | Found / Calc'd (as $C_{20}H_{22}O_3$) | 77.48 / 77.39 | 7.20 / 7.15 | -------- |
| 2 | do | Pyrethric acid chloride | A | (2) | 85 | 1.5174 | Found / Calc'd (as $C_{21}H_{22}O_5$) | 71.28 / 71.17 | 6.29 / 6.26 | -------- |
| 3 | do | 2,2,3,3-tetramethylcyclopropanecarboxylic acid chloride. | A | (3) | 88 | (¹) | Found / Calc'd (as $C_{18}H_{20}O_3$) | 76.23 / 76.03 | 7.19 / 7.09 | -------- |
| 4 | do | 2,2,3-trimethylcyclopropanecarboxylic acid chloride. | A | (4) | 85 | 1.4921 | Found / Calc'd (as $C_{17}H_{18}O_3$) | 75.32 / 75.53 | 6.80 / 6.71 | -------- |
| 5 | do | 2,2-dimethylcyclopropanecarboxylic acid chloride. | A | (5) | 88 | 1.4962 | Found / Calc'd (as $C_{16}H_{16}O_3$) | 74.71 / 74.98 | 6.21 / 6.29 | -------- |
| 6 | 3-(2-methyl-5-propargyl)-furylethynyl carbinol. | Chrysanthemic acid chloride. | A | (6) | 81 | 1.5037 | Found / Calc'd (as $C_{21}H_{24}O_3$) | 77.39 / 77.45 | 7.41 / 7.46 | -------- |
| 7 | do | 2,2,3,3-tetramethylcyclopropanecarboxylic acid chloride. | A | (7) | 80 | 1.4936 | Found / Calc'd (as $C_{19}H_{22}O_3$) | 76.39 / 76.48 | 7.38 / 7.43 | -------- |
| 8 | 2-(5-propargyl)-furylpropargyl carbinol. | Chrysanthemic acid chloride. | A | (8) | 83 | 1.4700 | Found / Calc'd (as $C_{21}H_{24}O_3$) | 77.91 / 77.75 | 7.55 / 7.46 | -------- |
| 9 | 2-(5-propargyl)-furylallyl carbinol. | do | A | (9) | 88 | 1.4747 | Found / Calc'd (as $C_{21}H_{26}O_3$) | 77.40 / 77.27 | 8.18 / 8.03 | -------- |
| 10 | 2-(5-propargyl)-thienylpropargyl carbinol. | do | A | (10) | 83 | 1.4970 | Found / Calc'd (as $C_{21}H_{24}O_2S$) | 74.19 / 74.08 | 7.20 / 7.10 | 9.38 / 9.42 |
| 11 | 2-(5-propargyl)-thienylethynyl carbinol. | do | A | (11) | 82 | 1.5272 | Found / Calc'd (as $C_{20}H_{22}O_2S$) | 73.38 / 73.58 | 6.65 / 6.79 | 9.78 / 9.82 |
| 12 | do | 2,2,3,3-tetramethylcyclopropanecarboxylic acid chloride. | A | (12) | 85 | 1.5226 | Found / Calc'd (as $C_{18}H_{20}O_2S$) | 71.65 / 71.96 | 6.78 / 6.71 | 10.70 / 10.67 |
| 13 | 2-(5-allyl)-furylethynyl carbinol. | Chrysanthemic acid chloride. | A | (13) | 82 | 1.4986 | Found / Calc'd (as $C_{20}H_{24}O_3$) | 76.79 / 76.89 | 7.74 / 7.74 | -------- |
| 14 | 2-(5-3'-butynyl)-furyl-ethynyl carbinol. | 2,2,3,3-tetramethylcyclopropanecarboxylic acid chloride. | A | (14) | 84 | 1.4774 | Found / Calc'd (as $C_{19}H_{22}O_3$) | 76.55 / 76.48 | 7.53 / 7.43 | -------- |
| 15 | 2-(5-methoxyethyl)-furyl-ethynyl carbinol. | Chrysanthemic acid chloride. | A | (15) | 83 | 1.4960 | Found / Calc'd (as $C_{20}H_{26}O_3$) | 72.69 / 72.70 | 7.91 / 7.93 | -------- |
| 16 | 3-(2-chloro-5-propargyl)-furylethynyl carbinol. | do | A | (16) | 78 | 1.5120 | Found / Calc'd (as $C_{20}H_{21}O_2Cl$) | 69.70 / 69.66 | 6.08 / 6.14 | 10.11 / 10.28 |
| 17 | 2-(5-propargyl)-furyl-ethynyl carbinol. | 2,2,3-trimethyl-3-ethyl-cyclopropanecarboxylic acid chloride. | A | (17) | 82 | 1.4772 | Found / Calc'd (as $C_{19}H_{22}O_3$) | 76.19 / 76.48 | 7.55 / 7.43 | -------- |

¹ M.P. 77.5°–78.5° C.

The present compounds represented by the formula [I] are novel compounds discovered firstly by the present inventors, and are confirmed to be useful in practice as more excellent insecticides, compared with those known in the official gazette of Japanese Patent Publication No. 11,318/1970 and the specification of Belgian Patent No. 738,112. The following Referential Examples are given in order to clear the fact.

Referential Example 1

There were prepared mosquito coils containing each of 0.3% and 0.6% of the present compounds (1), (3), (4) and (5), 5-allyl-α-methylfurfuryl chrysanthemate (described in Japanese Patent Publication No. 11,318/1970), 5-benzyl-3-(α-ethynyl)furylmethyl chrysanthemate and allethrin.

A group of about twenty northern house mosquito adults was liberated in a $(70 \text{ cm})^3$ glass chamber, and a mosquito coil ignited on both ends was placed at a center of the bottom of the glass chamber. Thereafter, the number of knocked down mosquitoes was observed for 24 minutes according to the lapse of time. The test was repeated several times on each mosquito coil, and thereafter 50% knock down time ($KT_{50}$) was calculated. On the other hand, only mosquitoes knocked down for 24 minutes were transferred into an observation cage, were fed and were allowed to stand till next day, and the dead and alive were observed to calculate the mortality.

The results thereof are shown in the following table.

Insecticidal effects of the mosquito coils on northern house mosquito adults

| Compound | 0.3% Mosquito coil | | 0.6% Mosquito coil | |
|---|---|---|---|---|
| | $KT_{50}$ (min. sec.) | Mortality (%) | $KT_{50}$ (min. sec.) | Mortality (%) |
| Present compound (1) | 10'00" | 87 | 7'24" | 93 |
| do. (3) | 5'18" | 100 | 3'24" | 100 |
| do. (4) | 8'30" | 88 | 5'24" | 95 |
| do. (5) | 8'24" | 90 | 5'30" | 97 |
| 5-Allyl-α-methylfurfuryl chrysanthemate | 24'36" | 10 | 21'00" | 18 |
| 5-Benzyl-3-(α-ethynyl)-furylmethyl chrysanthemate | 23'00" | 16 | 19'06" | 30 |
| Allethrin | 13'30" | 43 | 10'54" | 73 |

Referential Example 2

The present compounds (1), (3) and (4), 5-allyl-α-methylfurfuryl chrysanthemate defined above, 5-benzyl-3-(α-ethynyl)furylmethyl chrysanthemate defined above and natural pyrethrin were repsectively prepared in desired test concentrations with deodorized kerosene.

A group of twenty houseflies was liberated in a $(70 \text{ cm})^3$ glass chamber, and each of 0.7 ml of oil spray was sprayed uniformly into the glass chamber under pressure of $1.5 \text{ kg/cm}^2$ by means of a glass atomizer. The number of knocked down flies were observed according to lapse of time, and flies knocked down for 10 minutes were gathered and fed, and thereafter allowed to stand till next day. The dead and alive were observed to calculate $KT_{50}$ (time required for killing 50% of insects) and mortality, which are shown as follows.

Insecticidal effects of the oil spray on housefly adults

| Compound | Conc. (%) | $KT_{50}$ (sec.) | Mortality (%) |
|---|---|---|---|
| Present compound (1) | 0.1 | 125 | 72 |
| do. (3) | 0.1 | 110 | 65 |
| do. (4) | 0.1 | 120 | 36 |
| 5-Allyl-α-methylfurfuryl chrysanthemate | 0.5 | >600 | — |
| 5-Benzyl-3-(α-ethynyl)-furylmethyl chrysanthemate | 0.5 | >600 | — |
| Pyrethrin | 0.1 | 138 | 35 |

Referential Example 3

The present compounds (1), (3) and (4), 5-allyl-α-methylfurfuryl chrysanthemate defined above, 5-benzyl-3-(α-ethynyl)furylmethyl chrysanthemate defined above and allethrin were respectively prepared to 0.2% oil sprays with deodorized kerosene.

Each of 5 ml of oil sprays was sprayed for about 7 seconds by means of Campbell's turn table apparatus [Soap and Sanitary chemicals, Vol. 14, No. 6, 119 (1938)], and the shutter was opened at 30 seconds after the start of spray. A group of about 100 housefly adults previously liberated in a lower part of the apparatus were exposed to descending mist for 10 minutes, and the number of the knocked down flies was observed. The all flies were transferred into observation cage, were fed and thereafter were allowed to stand till next day. The death and alive were observed to calculate mortality. The results are shown as follows.

Insecticidal effects of the oil spray on housefly adults

| Compound | Conc. (%) | Knock down ratio after 10 min. (%) | Mortality (%) |
|---|---|---|---|
| Present compound (1) | 0.2 | 100 | 100 |
| do. (3) | 0.2 | 100 | 100 |
| do. (4) | 0.2 | 100 | 91 |
| 5-Allyl-α-methylfurfuryl chrysanthemate | 0.2 | 0 | 65 |
| 5-Benzyl-3-(α-ethynyl)-furylmethyl chrysanthemate | 0.2 | 0 | 89 |
| Allethrin | 0.2 | 100 | 74 |

In the preparation of an insecticidal composition containing as an effective ingredient the present compound, it is sometimes preferable to dissolve the present compound previously in an organic solvent such as xylene, methylnaphthalene, acetone and trichloroethane, and according to the conventional method applied to the pyrethrum extract, allethrin and the like using a diluent for the conventional insecticides, the present compounds may be formulated optionally into any form such as oil sprays, emulsifiable concentrates, wettable powders, dusts, aerosols, mosquito coils, fumigants with an electric heat, other fumigants such as fumigants by means of steam vaporizing or fumigants compounding the active ingredients into the proper plastic materials or other suitable materials to release the active ingredients as vapor even at ordinary room temperature, granules and, dusts and solids combined with attractants or baits. In addition, the present compounds may be enhanced in their insecticidal effects by the combination with a synergist for pyrethroids, such as 3,4-methylenedioxy-6-propylbenzylburyldie-thyleneglycol ether (hereinafter referred to as piperonylbutoxide), 1,2-methylenedioxy-4-2-(octylsulfinyl)-propylbenzene (hereinafter referred to as sulfoxide), 4-(3,4-methylenedioxyphenyl)-5-methyl-1,3-dioxane (hereinafter referred to as safroxane), N-(2-ethylhexyl)-bicyclo[2,2,1]hept-5 -ene-2,3-dicarboxyimide (hereinafter referred to as MGK-264), N-(4-pentynyl)-phthalimide or O-n-propyl-O-propargylphenyl phosphonate (hereinafter referred to as NIA-16388) and the like, or particularly in the preparation of mosquito coils, it may also be possible to enhance the effect by addition of such a known additive as terephthalic acid, isophthalic acid, BHT and the like.

On the other hand, an insecticidal composition having multipurposes may also be prepared by the combination with other biological materials, for example, a cyclopropanecarboxylic acid ester type insecticide, such as pyrethrum extract, allethrin, N-crysanthemoxymethyl)-3,4,5,6-tetrahydrophthalimide (hereinafter referred to as phthalthrin), 5-benzyl-3-furylmethyl chrysanthemate [hereinafter referred to as Chrysron (a registered trade mark of Sumitomo Chemical Co., Ltd.)], and the like, an organic chlorine type insecticide such as DDT, BHC and the like, an organic phosphorus type insecticide such as O,O-dimethyl-O-(3-methyl-4-nitrophenyl) phosphorothioate [hereinafter referred to as Sumithion (a registered trade mark of Sumitomo Chemical Co., Ltd.)], 0,0-dimethyl-0-(2,2-dichlorovinyl)phosphate (hereinafter referred to as DDVP) and the like, a carbamate type insecticide such as 1-naphthyl N-methylcarbamate, 3,4-dimethylphenyl N-methylcarbamate, 3,5-dimethylphenyl N-methylcarbamate and the like, and other insecticides, fungicides, acaricides and herbicides, and with fertilizers and other agricultural chemicals.

The process for the preparation of insecticides will be illustrated with reference to the following Examples, in which the names of the compounds are represented by the compound numbers mentioned above, and parts and % are by weight.

Example 18

Each of 0.2 part of the present compounds (1) to (17) was dissolved respectively in deodorized kerosene to make the whole 100 parts, whereby each 0.2% oil spray was obtained.

Example 19

Each mixture of each of 0.2 part of the present compounds (1), (3) and (7) with 1 part of piperonylbutoxide was respectively dissolved in deodorized kerosene to make the whole 100 parts, whereby each oil spray was obtained.

Example 20

Each of 20 parts of the present compounds (1), (4), (5), (6), (8), (12), (16) and (17), 10 parts of Sorpol SM-200 (trade mark of Toho Chemical Co.) and 70 parts of xylene were respectively mixed and dissolved under sufficient stirring, whereby each emulsifiable concentrate containing 20% of each present compound was obtained.

Example 21

Each solution of each of 1 g of the present compounds (1), (3), (12), (14) and (15) in 20 ml of methanol was uniformly mixed under stirring with 99 g of a carrier for a mosquito coil (a mixture of Tabu powder, marc and wood powder in a mixing ratio of 3 : 5 : 1), and methanol was evaporated. Thereafter the mixture was sufficiently kneaded with 150 ml of water, and the resultant was formulated and dried, whereby each mosquito coil was obtained.

Example 22

Each solution of each of 1 part of the present compounds (1), (6), (13) and (15), with 2 parts of safroxane in 20 parts of acetone was respectively mixed sufficiently with 97 parts of 300 mesh diatomaceous earth in a mixing and grinding machine, and thereafter evaporation of acetone gave each dust.

Example 23

Each solution of each of 0.3 part of the present compounds (1), (6), (7), (11) and (15), with 0.1 part of phthalthrin and 0.5 part of Sumithion (trade mark of Sumitomo Chemical Co., Ltd.) in 7.5 parts of xylene and 6.6 parts of deodorized kerosene was introduced into an aerosol vessel, which was equipped with a valve portion, and 85 parts of a propellent (a liquified petroleum gas) was charged under a pressure into the vessel through the valve portion, whereby each aerosol was obtained.

Example 24

Each mixture of each of 0.2 part of the present compounds (1), (2), (3) and (11), 0.2 part of phthalthrin, 3.2 parts of piperonylbutoxide 10.4 parts of deodorized kerosene and 1 part of an emulsifier Atmos 300 (trade mark of Atlas Chemical Co.) was emulsified in 50 parts of pure water, and the emulsion was introduced into an aerosol vessel together with 35 parts of a mixture of deodorized butane and deodorized propane in a mixing ratio of 3 : 1, whereby each water-base aerosol was obtained.

Example 25

Each mixture of each of 20 parts of the present compounds (1) and (14), with 5 parts of 1-naphthyl-N-methylcarbamate and 5 parts of Sorpol SM-200 was kneaded sufficiently with 70 parts of 300 mesh talc in a mixing and grinding machine, whereby each wettable powder was obtained.

Example 26

A mixture of 5 parts of the present compound (1), with 5 parts of Toyolignin CT (trade mark of Toyobo Co.) and 90 parts of GSM clay (trade mark of Zeaklite Co.), was kneaded sufficiently in a mixing and grinding machine. Successively water was added to the mixture in a 10% amount based on the weight of the mixture, and the resultant was kneaded further under stirring, was granulated by means of a granulator and was air-dried, whereby granule was obtained.

Example 27

A solution of 0.2 g of the present compound (1), with 0.2 g of allethrin in a suitable amount of chloroform was impregnated in asbestos having 2.5 × 1.5 cm of area and 0.3 mm of thickness, whereby insecticidal fibrous fumigant for heating on a hot plate was obtained. Materials having an effect equivalent to asbestos, for example, pulp plate and the like may also be used as the fibrous carrier.

Example 28

A solution of 0.2 part of the present compound (3) and 0.2 part of Chrysron in 7 parts of xylene and 7.6 parts of deodorized kerosene was treated according to the procedure similar to that of Example 23, whereby an aerosol was obtained.

Example 29

Each solution of each of 0.3 g of the present compounds (1), (3), (6), (7) and (15) with 0.2 g of allethrin in 20 ml of methanol was respectively treated according to the procedure similar to that of Example 21, whereby each mosquito coil was obtained.

Example 30

A solution of each of 0.2 g of the present compounds (1), (3), (4) and (5) in a suitable amount of chloroform was treated according to the procedure similar to that of Example 27, whereby each insecticidal fibrous fumigant for heating on a hot plate was obtained.

Example 31

A mixture of 0.3 part of the present compound (1), 0.1 part of 3-phenoxybenzyl chrysanthemate, 0.8 part of thanite (isobornyl thiocyanoacetate: synergist) 6.5 parts of xylene and 7.3 parts of deodorized kerosene was treated according to the procedure similar to that of Example 23, whereby an aerosol was obtained.

Example 32

A solution of 0.3 part of the present compound (1), 1.5 parts of S-421 (octachlorodipropyl ether: synergist) 6.2 parts of xylene and 7 parts of deodorized kerosene was treated according to the procedure similar to that of Example 23, whereby an aerosol was obtained.

Example 33

A mixture of the present compound (1), 5 parts of Chrysron and 10 parts of Sorpol SM-200 was dissolved in 70 parts of xylene under stirring, whereby an emulsifiable concentrate was obtained.

Example 34

A solution of 0.3 g of the present compound (1) and 0.2 g of 5-propargylfurfuryl chrysanthemate in 20 ml of methanol was treated according to the procedure similar to that of Example 21, whereby a mosquito coil was obtained.

Example 35

A solution of 0.1 g of the present compound (1) and 0.1 g of 5-propargyl-2-methyl-3-furylmethyl chrysanthemate in a suitable amount of chloroform was treated according to the procedure similar to that of Example 27, whereby an insecticidal fibrous fumigant for heating on a hot plate was obtained.

Example 36

A mixture of 15 parts of the present compound (3), 5 parts of DDVP and 10 parts of Sorpol SM-200 was dissolved in 70 parts of xylene under stirring, whereby an emulsifiable concentrate was obtained.

Insecticidal effects of the present compounds will be substantiated with reference to the following Test Examples.

Test Example 1

Each of 0.5 ml of oil sprays obtained in Example 18, and a 0.2 % oil spray obtained by treating commercially available allethrin (technical grade) according to the procedure similar to that of Example 36 was sprayed by means of the Campbell's turn table apparatus [Soap and Sanitary Chemicals, Vol. 14, No. 6, 119 (1938)], over about 7 seconds. The shutter was opened at 30 seconds after starting the spray, and housefly adults (a group of about 100 flies) previously liberated in a lower part of the apparatus were exposed to descending mist for 10 minutes, were transferred to an observation cage, were fed and were allowed to stand up to next day. There was observed the mortality of 74 % by allethrin.

On the other hand, 80 % or more of flies was killed by any of oil sprays according to the present invention.

Test Examples 2

Into a (70 cm)$^3$ glass chamber, about 50 northern house mosquito adults were liberated, and each of 0.7 ml of oil sprays obtained in Example 19 was sprayed under pressure of 20 lb. by means of a glass atomizer, whereby 80 % or more of mosquitoes was knocked down within 10 minutes.

Test Examples 3

Insecticidal effects on housefly adults of aerosols obtained in Examples 23, 24 and 28 were examined according to the aerosol testing method using Peet Grady's chamber (6 ft)$^3$ [Soap and Chemical Specialities, Blue Book (1965)]. The results are shown in the following table.

Insecticidal effects of the aerosol

| Composition | Amounts sprayed (g/1000 ft$^3$) | Knock down ratio | | | Mortality (%) |
|---|---|---|---|---|---|
| | | 5 min. | 10 min. | 15 min. | |
| Aerosol of Example 23 | | | | | |
| Present compound (1) | 3.1 | 38 | 76 | 92 | 84 |
| do. (6) | 2.9 | 34 | 72 | 90 | 82 |
| do. (7) | 3.0 | 37 | 78 | 92 | 80 |
| do. (11) | 3.0 | 30 | 71 | 88 | 86 |
| do. (15) | 3.1 | 27 | 69 | 86 | 79 |
| Aerosol of Example 24 | | | | | |
| Present compound (1) | 2.9 | 42 | 80 | 96 | 78 |
| do. (2) | 2.9 | 45 | 85 | 98 | 75 |
| do. (3) | 3.0 | 47 | 87 | 98 | 77 |
| do. (11) | 3.0 | 37 | 80 | 95 | 80 |
| Aerosol of Example 28 | 3.1 | 35 | 78 | 94 | 78 |

Test Example 4

Emulsifiable concentrates obtained in Examples 20 were respectively diluted in 20,000 times with water, and 2 liters of the resultant was introduced into a polystyrene case having 23 + 30 cm of area and 6 cm of depth. About 100 larvae of northern house mosquitoes were liberated therein, and on next day it was observed that 80 % or more of larvae was killed by any of the emulsifiable concentrates.

Test Example 5

Rice plants which elapsed 45 days after sowing were grown in a 1/50,000 Wagner's pot, and emulsifiable concentrates containing the present compound (11) among emulsifiable concentrates obtained in Example 20, and emulsions obtained by diluting in 100 times with water the wettable powders obtained in Example 25, were respectively sprayed in an amount ratio of 10 ml/pot. The whole was covered with a wire net and about 30 green rice leafhopper adults were liberated therein. After a day, 80% or more of the leafhopper adults was killed.

Test Example 6

Into 100 g of unhulled rice, each of 200 mg of dusts obtained in Example 22 was mixed sufficiently under stirring, and the mixture was introduced into a 100 ml glass Erlenmeyer flask. About 50 rice weevils were liverated therein and the flask was covered. After a week, 80% or more of the rice weevils was killed.

Test Example 7

Into a (70 cm)$^3$ glass chamber, about 50 housefly adults were liberated and a battery-driven small motor fan (13 cm in a blade diameter) was placed in the chamber and rotated. Subsequently, the insecticidal fumigant obtained in Example 27 was placed on an electrically heated plate and fumigated in the chamber. As the result, 80% or more of the flies was knocked down within 20 minutes.

Test Example 8

To the bottom of a glass Petri dish of 14 cm in diameter, each of the dusts obtained in Examples 22 was uniformly dusted in a proportion of 2 g/m$^2$, and butter was coated on the lower part of the dish, leaving an uncoated portion of 1 cm, in width, subsequently, a group of about 10 adults of German cockroaches were liberated in the dish and contacted with the dust for 30 minutes. As the result, 80% or more of the cockroaches was knocked down, and 70% or more of the knocked-down insects could be killed on the third day after the contact.

Test Example 9

Into a 14 l polybacket, 10 l of water was introduced, and each of 2 g of granules obtained in Example 26 was added thereinto. After a day, about 100 full grown larvae of northern house mosquitoes were liberated therein, and it was observed that 90% or more of the larvae was killed.

Test Example 10

Into a (70 cm)$^3$ glass chamber, a group of about 20 northern mosquito adults were liberated, and a battery-driven small motor fan (13 cm in a blade diameter) was placed in the chamber and was rotated. Each of 1 g of the mosquito coils which were obtained in Examples 21 and 29, and were ignited on both ends, was placed therein. As the result, 90% or more of mosquitoes was killed within 20 minutes by any of the mosquito coils.

Test Example 11

Two glass cylinders having 20 cm of diameter and 40 cm of height were put one on another, and each insecticidal fumigant which was obtained in Examples 30 and 35 and which was placed on an electric heating plate was put in the bottom of the lower cylinder. Successively, another glass cylinder having 20 cm of diameter and 20 cm of height, both ends of which were covered with a net, and in which 20 housefly adults were liberated was put on the upside of the above-mentioned cylinders, and then an electric current was sent to the plate, whereby 100% of the housefly adults was knocked down within 20 minutes by any of the fumigants.

Test Example 12

The effect of the insecticidal fumigants obtained in Examples 30 and 35, on German cockroaches was examined according to the procedure similar to that of Test Example 11, and it was observed that 100% of the cockroaches was knocked down within 30 minutes by any of the fumigants.

Test Examples 13

Using the same apparatus as in Test Example 11 and 1 g of the mosquito coil obtained in Example 34, one side of which was ignited, a smoking effect on northern house mosquito adults was examined, and it was observed that 100% of the mosquitoes was knocked down within 20 minute smoking.

Test Example 14

Glass cylinder having 20 cm of diameter and 20 cm height, both ends of which were covered with a wire net and in which 20 adults of German cockroaches were liberated, was put on another glass cylinder having 20 cm of diameter and 40 cm of height. Other glass cylinder having 20 cm of diameter and 40 cm of height was further put thereon. Aerosols obtained in Examples 31 and 32 were respectively sprayed downwards from the upper side of the cylinder for one second. As the results, 100% of the cockroaches was knocked down within 20 minutes, and the cockroaches knocked down were, 20 minutes thereafter, taken out and allowed to stand at room temperature, whereby 90% or more of the cockroaches was killed after 2 days.

Test Examples 15

Into each emulsion prepared by diluting the emulsifiable concentrates obtained in Examples 20, 33 and 36, to 50 and 500 times with water, tomato plants which had been elapsed one month after sowing, were dipped for one minute, and were, after air-drying, transferred to a plastic vessel equipped with a cover. Into the vessel, 28-spotted lady beetles (Epilachna vigintioctopunctata) were libertated, and 80 % or more thereof was killed after 5 days by any of 50 times dilutions. On the other hand, a repellent effect was confirmed by the fact that there was observed almost on damage on the tomato plants treated with the 500 times dilutions though the beetles were alive.

Test Example 16

Into a glass Petri dish having 14 cm of diameter, 10 3rd to 4th instar larvae of tobacco cutworms (Prodenia litura) were liberated, and each one ml of emulsions prepared by diluting the emulsifiable concentrates obtained in Examples 20, 33 and 36 to 200 times with water was sprayed with a spray tower. Thereafter the cutworms were transferred to anothe Petri dish in which a bait was placed, and allowed to stand, whereby 90% or more of the cutworms was killed after 2 days.

What is claimed is:
1. A cyclopropanecarboxylate of the formula

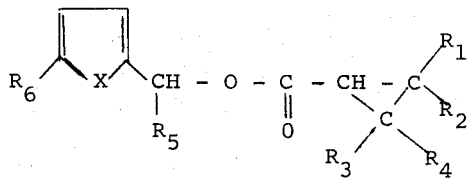

wherein $R_1$ is hydrogen atom, methyl or ethyl group; $R_2$ is methyl, ethyl, 2-methyl-1-propenyl or 2-methoxycarbonyl-1-propenyl group when $R_1$ is hydrogen atom, or $R_2$ is methyl or ethyl group when $R_1$ is methyl or ethyl group; $R_3$ and $R_4$ are respectively hydrogen atom, methyl or ethyl group, with the proviso that $R_1$, $R_3$, and $R_4$ are not simultaneously hydrogen; $R_5$ is $C_2 - C_4$ alkynyl or $C_2 - C_4$ alkenyl; $R_6$ is propargyl, allyl, 3-butyne-1-yl, $C_1 - C_4$ alkoxy $C_1 - C_4$ alkyl; and X is oxygen or sulfur atom.

2. A cyclopropanecarboxylate of the formula

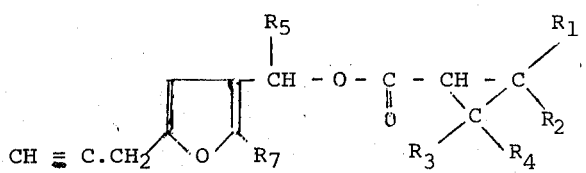

wherein $R_1$ is hydrogen atom, methyl or ethyl group; $R_2$ is methyl, ethyl, 2-methyl-1-propenyl or 2-methoxycarbonyl-1-propenyl group when $R_1$ is hydrogen atom, or $R_2$ is methyl or ethyl group when $R_1$ is methyl or ethyl group; $R_3$ and $R_4$ are respectively hydrogen atom, methyl or ethyl group, with the proviso that $R_1$, $R_3$, and $R_4$ are not simultaneously hydrogen; $R_5$ is $C_2 - C_4$ alkynyl, and $R_7$ is chlorine atom or methyl.

3. The cyclopropanecarboxylate of claim 2 of the formula

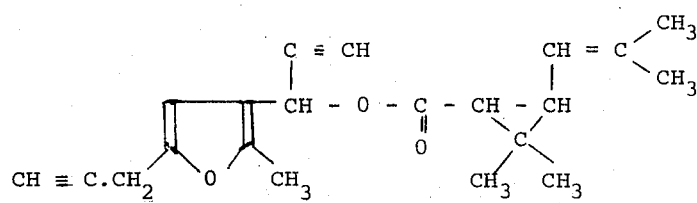

4. The cyclopropanecarboxylate of claim 2 of the formula

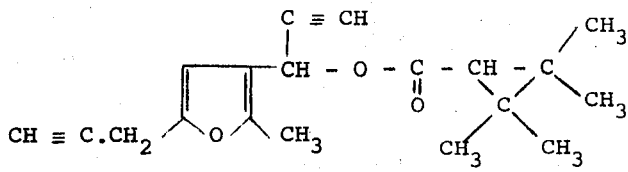

5. The cyclopropanecarboxylate of claim 2 of the formula

6. A cyclopropanecarboxylate of the formula:

wherein X, $R_1$, $R_2$, $R_3$ and $R_4$ are as defined in claim 1.

7. A cyclopropanecarboxylate according to claim 1, wherein $R_1$ is hydrogen atom, $R_2$ is 2-methyl-1-propenyl group, and $R_3$ and $R_4$ are methyl groups.

8. A cyclopropanecarboxylate according to claim 1, wherein $R_1$, $R_2$, $R_3$ and $R_4$ are methyl groups.

9. A cyclopropanecarboxylate according to claim 1, wherein $R_1$ is hydrogen atom, and $R_2$, $R_3$ and $R_4$ are methyl groups.

10. A cyclopropanecarboxylate according to claim 1, wherein $R_1$ and $R_2$ are methyl groups, and $R_3$ and $R_4$ are hydrogen atoms.

11. A cyclopropanecarboxylate according to claim 1, wherein X is oxygen atom.

12. A cyclopropanecarboxylate according to claim 1, wherein the alkynyl group is ethynyl group.

13. A cyclopropanecarboxylate according to claim 1, wherein the alkynyl group is propargyl group.

14. A compound of the formula,

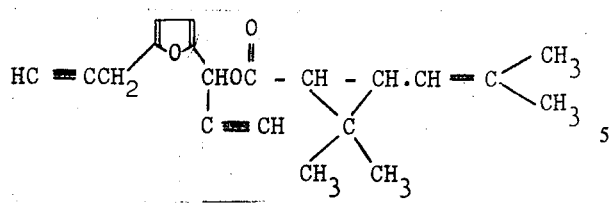
15. A compound of the formula,
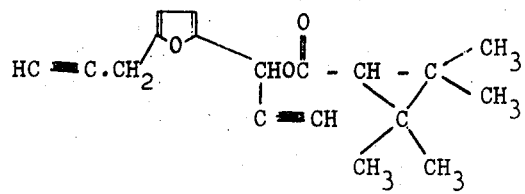
16. A compound of the formula,
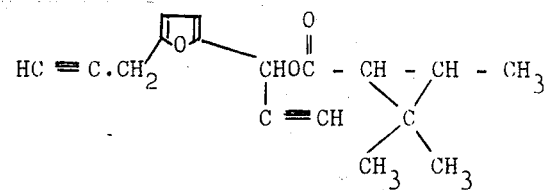
17. A compound of the formula,
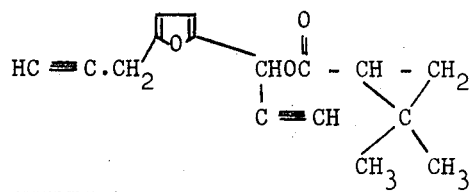
* * * * *